United States Patent Office 2,914,411
Patented Nov. 24, 1959

2,914,411

CITRUS CONCENTRATE PRODUCT

Harry A. Toulmin, Jr., Dayton, Ohio, assignor, by mesne assignments, to Union Carbide Corporation, New York, N.Y., a corporation of New York No Drawing. Application January 26, 1956
Serial No. 561,690

2 Claims. (Cl. 99—205)

This invention relates to a product formed by the concentration of citrus juices, and in particular to citrus juices formed by the extraction of water through progressive freezing. This application is a continuation-in-part of Serial No. 292,398, filed June 7, 1952, now abandoned.

The object of this invention is to provide a concentrated citrus product that contains all of the original constituents of the natural fruit juice except the water which is removed without any change or loss of other components in the natural juice.

It is a further object to provide a concentrated juice product in which the natural juice which contains components for its preservation are enhanced by the addition of juice from the albedo layer of the fruits in order to increase the natural preserving characteristic property as provided by the citrus fruit itself by components in the albedo layer.

It is the further object to increase the natural balance of the components of the citrus juice which function as preservatives and protect it from deterioration through bacterial and enzymatic contamination and growth.

Prior to this invention citrus juices have been concentrated by employing a combination of high vacuum and heat. Theoretically, the heat applied to the juices have been concentrated by employing a combination of high vacuum and heat. Theoretically, the heat applied to the juice to dehydrate it was such as to raise the temperature to approximately 70° F., but in actual practice, when citrus juices have been thus concentrated, the temperature during heating is allowed to go up to 165° F. to 170° F., use being made of either dual or triple effect evaporators, and wherein the maximum vacuum possible was applied in order to rapidly evaporate and remove the water. Inasmuch as citrus juices are largely composed of sugars, the result has been that any contamination of the fruit juice such as by bacterial contamination brought about an increase of the bacterial count as well as enzymatic growth. This is accounted for due to the fact that the presence of sugar and heat provide a natural cultural medium for the growth of bacteria and action of enzymes. Such action produces gelling of the citrus product when it is canned and its ultimate rejection by the consuming public.

In addition to these disadvantages of prior methods of dehydration of fruit juices, as explained, the use of heat and high vacuum results in the extraction and loss of volatile terpenes which function as protective elements in the fruit preventing it from spoiling.

Use of heat and sub-atmospheric pressures results in the loss of terpenes and sesquiterpenes along with the delicate esters and volatile aromatics that give the juice its characteristic flavor and aroma. The application of heat, particularly heat up to 165° F. to 170° F., causes the juice when thus concentrated to approximately 50° to 55° Brix to acquire an offensive taste and odor. In an attempt to overcome this condition, it has been the practice to introduce sufficient processed raw juice as a cutback to reduce the Brix to approximately 42° to 44° and provide a juice having acceptable odor and taste.

Juice concentrate, however, produced by high vacuum and heat with cutback raw juice added still has a different taste and odor from juice that has not been so treated. This product forms a mixture that in itself is frequently distasteful or unacceptable to many people.

Fruit in nature, such as an orange, is provided with an outer covering or layer known as the flavedo or peel. The flavedo layer contains peel oil which is relatively bitter. It comprises terpenes and sesquiterpenes which are repulsive to insects and prevents the growth of harmful bacteria. Carotene pigment in the flavedo covering layer gives the fruit its characteristic orange color.

Inside of the flavedo coating is a relatively thick cellulous body known as the albedo layer or covering, and which contains various constituents in the form of water or juice which have antibiotic properties.

I have found that such albedo waters as are expressed from the albedo if applied to the juice without contamination by constituents of the flavedo layer provide an effective preservative and act as an antibacterial addition agent to eliminate harmful bacteria and enzyme action.

In the present practice of the prior art, in the production of orange juice concentrate for example, the orange is first cut in half by knives or other means. The knives become contaminated with bacteria and dirt on the exterior of the flavedo layer despite the usual washing that is applied. During cutting of the fruit, these knives also become contaminated with the peel oil.

After cutting the orange in half, it is then placed in a press and squeezed to the utmost to get the maximum amount of juice from the orange. The flavedo peel oil, and any accumulation of bacteria in the external portion of it and its terpenes and sesquiterpenes, together with the seeds, pulp and rag, and juice, are collected.

This press treatment results in breaking the seeds and releasing the seven seed oils within the seeds which oils are normally used in the manufacture of industrial finishes such as paint and varnish. The orange juice thus produced contains peel oil, also an excess amount of terpenes and sesquiterpenes from the peel oil beyond the amount of terpenes and sesquiterpenes found in the juice normally, and the seven seed oils as aforementioned together with an excessive amount of the carotene and other materials from the flavedo and albedo layers.

Thus, by the prior art processes of separation or orange juice from oranges, the normal protective balance within the orange juice itself, provided by nature, is destroyed and the juice becomes a fertile field for the growth of bacteria and enzymes with which it is contaminated, especially as the piercing operation is carried out in the open air of a concentration plant, or in the presence of heat and sugar. Such plants are operated generally in warm countries and few, if any, effective precautions can be taken within the plant to protect juice other than to convey it in the normal mechanical manner. In carrying out the so-called "heat and high vacuum process," the temperature of evaporation as aforementioned is usually on the order of 160° F. to 170° F. and this heating together with high vacuum removes volatile components and materials which further upset the natural, self-protecting chemical balance present in the natural juice.

It has been found that if an orange is maintained in its natural state without its flavedo and albedo layer being ruptured and without any injury to the fruit, the fruit will last almost indefinitely. This is believed to be due to the fact that the natural orange juice within the orange has in it the proper amount of preservative substances to maintain it in a critical balance whereby it does not spoil. Its terpene and its sesquiterpene content in the peel oil are just sufficient to act as a natural preservative to prevent enzymatic and bacteriological spoilage. It also contains a sufficient amount of the antibiotic vitamin P in the albedo layer to prevent the growth of bacteria. This delicate balance of terpenes and sesquiterpenes and other antibiotics in the fruit function to prevent the growth of harmful bacteria and thus avoid oxidation and spoilage of the juice.

In the instant invention, as a result of exhaustive experimentation and study, and a long series of tests and bacteriological studies, as well as chemical studies, extending over a considerable period of time, I have found that the product of this invention can be produced having the same flavor, odor and composition as in its original native state. It can be maintained in this fresh condition when it is immediately canned after having been dehydrated and fortified with albedo juice to approximately 42° Brix, or higher. After being so processed and canned it will remain in its original condition, and retain its original flavor, taste, odor and not spoil when stored, without refrigeration.

In the food concentrates field, there has long been sought a juice that could be so canned and which would not need refrigeration to keep it from spoiling. The only juice that is available at present and which is made by employing the high vacuum heat method described must be refrigerated immediately after its manufacture and maintained at zero temperature or freezing temperature until used by the customer.

I have found the product of this invention, as hereinafter described, will keep at room temperature and will be self-preserving. I have found that the bacteria count present in the juice initially is very small as low as 5000 per cc., and that this progressively decreases until it disappears at about the end of the third month. There is, however, no change in taste, color or odor when stored in cans for several months. Orange juice, for example, when processed and canned in accordance with this invention, after dehydration may be stored at the usual room temperature as found in stores, warehouses and the like without refrigeration. Tests have shown that the orange juice in its original state, when dehydrated as hereinafter set forth, produces a product that after canning is substantially free of oxidation while retaining its original content of terpenes and sesquiterpenes and other constituents of the citrus juice undisturbed and due to the additional presence of a small amount (1–5% by weight) of albedo water or extract the resistance of the juice to bacteriological and enzymatic action is maintained during storage at room temperature.

It is believed that hesperidin as contained in the fruit juice possesses the vitamin-like, antibacterial properties closely related to vitamin C. The antibacterial properties are particularly active in the presence of phosphorus. This is probably also true of naringin and hesperitin. These glucosides are present in the juice and more particularly in the albedo layer, their principal location being in the carpellary membranes at the boundary between the albedo and the juice segments. It is further believed that these juice components, particularly from the albedo juice prevents mould formation and growth of bacteria causing spoilage of the juice. Hesperidin is a flavanone derivative, 5,7,3'-trioxy-4'-methoxyflavanone-7-rhamnoglucoside. Included in this group is the hydrolyzed derivative, hesperetin. The formula of hesperidin is as follows:

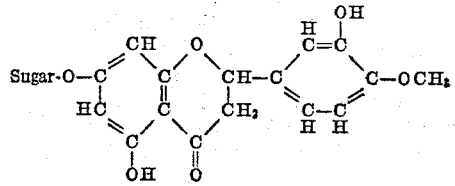

The formula of hesperetin is as follows:

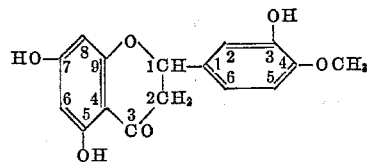

Associated with the group in the juice is citrin, a mixture of two glucosides, hesperidin and eriodictin. These flavanone glucosides yield upon hydrolysis, hesperitin and eriodictyol. Eriodictin has the formula:

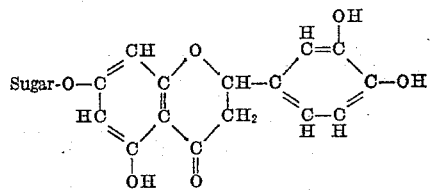

Citrin is now known as vitamin P. The glucosides and their derivatives apparently play their part in the maintenance of the delicate antibacterial and anti-enzymatic balance that prevent the juice from spoiling.

The foregoing is offered as a tentative explanation as the exact composition of the fruit and its components is not yet fully determined.

By eliminating the introduction of peel oil from the flavedo and entraining bacteria and foreign material as well as seed oils (which include palmitic, stearic, arachidic, linolenic, linoleic and oleic fatty acids) and such as results when the fruit seeds are ruptured and broken, while removing water, a citrus juice concentrate is produced which can be stored at room temperature without spoilage.

It is my discovery that the terpenes, sesquiterpenes and the glucosides in the fruit, e.g., orange or other citrus fruits, such as grapefruit, etc., and which contain hesperidin and naringin, and derivatives, function as antibacterial and anti-enzymatic agents, thus preserving the fruit. In order to maintain these substances in the juice, it is desirable to not upset this balance of preserving agents but to maintain it, and enhance its preserving characteristics by the further addition of juice pressed or extracted from the albedo layer of the fruit. It is well known that most of the terpenes and sesquiterpenes may be removed from citrus juices by a heat and vacuum distillation of the juice.

I have also discovered that, if orange juice or citrus juices of any kind are removed from the fruit without dehydration, they quickly oxidize unless protected from oxidation, and in the presence of the water which contains entrained oxygen the juice will spoil.

For instance, if juice is squeezed from the citrus fruit and placed in a container and allowed to stand in a refrigerator, it progressively deteriorates, separating into layers and losing its flavor and odor.

However, if the water content of the juice is reduced as by the process that I set forth hereinafter, spoilage of the juice is prevented and by canning the same promptly after processing and dehydration in accordance with my invention, it will last indefinitely without refrigeration. To this end, it has been found desirable to flush the can with carbon dioxide or, preferably, nitrogen, prior to introducing the dehydrated juice concentrate to avoid entrainment of air.

By dehydrating the juice without disturbing its chemical or physical composition balance (as in the case of the use of high vacuum and heat) I have been able to secure self-preserving citrus juice having sugar content of from 40° to 66° Brix without disturbing the taste, odor, aroma or composition of the original juice. By maintaining this biochemical balance of antibacterial constituents and providing a juice with a high sugar content and which is substantially oxygen free, a juice concentrate is obtained which can be stored at ordinary room temperatures without spoilage. This result is further insured by the addition of the albedo juice as set forth above and without introducing constituents of the flavedo layer.

My preferred process for the practice of this invention is as follows. The process of dehydrating by freezing as hereinafter set forth and the additional step of incorporating additional juice from the albedo layer constitutes essential steps of my process.

The flavedo or peel layer of the fruit is removed and the juice and seeds recovered. By applying just enough pressure to the albedo so that the albedo covering layer is ruptured without the use of cutting knives, the juice and seeds are expelled without the release of seed oil. While the pressure applied is sufficient to cause a small portion of the albedo water to enter the juice, the amount is insufficient to effect the desired preserving action. The amount of albedo water found to be effective is from 1 to 5% by weight of the concentrate, the requisite amount depending upon the particular fruit or vegetable juice being concentrated.

This juice, in the case of citrus fruit, is expressed from the albedo layer and walls enclosing the juice after the juice and seeds of the fruit have been expelled. While some of the fruit juice remains with the albedo and pulp and is recovered upon further pressing and squeezing of the pulp, this generally only amounts to about 10 to 15% by volume of the juice expressed from the albedo and pulp and referred to as albedo water or juice. This albedo water may be added to the juice before or after freezing out the water, and preferably to the juice concentrate where it does not lower the Brix value below that desired of the final product.

The process for the practice of the invention is preferably carried out as follows. There are two phases of the process. First the removal of the flavedo layer and a portion of the albedo layer, then pressing the juice from the peeled fruit and separation of seeds therefrom. Thereafter the recovered juice is subjected to step freeze dehydration and finally the juice pressed from the albedo layer is added to enhance the preserving qualities of the concentrated juice.

Removal of the flavedo layer may be accomplished by conventional abrading and washing treatment, whereby foreign matter as well as the peel or rind is washed away from the fruit. Thereafter the peeled fruit which comprises an albedo layer and tissue enclosing the juice, is ruptured by passing the fruit through a screw press. The juice is swept out along with the seeds, the latter being in unbroken condition. In this manner the juice is released in substantially sterile condition without contamination with seed oil and without the introduction of constituents from the peel or flavedo layer. Thus, all foreign matter, bacteria and the like on the exterior of the fruit is prevented from reaching the juice during its extraction. This first pressing is conducted so as to remove the greater part of the juice, e.g., 90 to 95%. Following this the residual pulp including the albedo and tissue of the juice cells is pressed to squeeze out the albedo water or fluid which is to comprise 1 to 5% by weight of the juice.

The compressing and rupturing of the albedo layer releases a small amount of juice from this albedo layer but this amount is insufficient to produce the desired preserving effect. This fluid pressed from the albedo layer and tissue may be mixed with the previously recovered juice which is to be dehydrated or to the dehydrated concentrate to provide a final product containing from 1 to 5% by weight of the juice from the albedo layer. The recovered juice free of pulp and seeds is dehydrated by the step-freeze dehydration process whereby substantially all of the water is removed and a concentrate having a Brix value or sugar content of from 40° to 66° is obtained.

Such a concentrate which contains little or no appreciable amount of water, and increased citric acid content and constituents from the albedo layer and having a Brix value of 40 or above, preferably 50 to 65° forms a product which does not require continuous refrigeration to protect it from spoiling. The albedo layer contains substantial amounts of citric acid, terpenes, pentoses and pentosans as well as phytosterolin and phytosterols. These constituents of the albedo and connecting cell tissue layer surrounding the citrous juice appear to have exceptional preserving power when incorporated in sufficient amount or proportion in the juice concentrate.

The step-freeze treatment is carried out similarly as illustrated and described in U.S. Patents Nos. 2,552,525; 2,559,204; and 2,559,205. In accordance with this process the juice is subjected to a series of successive freezing stages, and wherein the juice is maintained at about 5° F. lower at each succeeding freezing stage, a series of tanks being utilized to carry out the freezing steps. In the first tank the juice is introduced and subjected to a temperature of 34° F., and successive stages at 5° lower temperature. A typical set of freezing temperatures is as follows:

*Example I.—12% solids, orange juice; initial ice forming point, 28° F.*

1 tank—juice at 23° F., refrigerant 19° F.
2 tank—juice at 18° F., refrigerant 13° F.
3 tank—juice at 13° F., refrigerant 8° F.
4 tank—juice at 8° F., refrigerant 3° F.
5 tank—juice at 3° F., refrigerant —2° F.

*Example II.—10% solids, cider vinegar*

1 tank—juice at 27° F., refrigerant 22° F.
2 tank—juice at 22° F., refrigerant 17° F.
3 tank—juice at 17° F., refrigerant 12° F.
4 tank—juice at 12° F., refrigerant 7° F.
5 tank—juice at 7° F., refrigerant 2° F.

Different liquids have different initial congealing points so that a temperature scale is established for each material processed. Various temperatures at which ice crystals may form may be used in each or all tanks.

The juice of the fruit and albedo water admixed therewith is introduced into the series of tanks as described, where it is agitated to prevent the adherence of ice crystals to the freezing medium, so that the juice is progressively dehydrated and the water frozen out as ice crystals during the several stages of freezing treatments so that the ice crystals do not occlude any appreciable amount of the solvents of the juice. In the refrigeration as carried out in the series of tanks, the differential temperature between the tanks is approximately 5° F. so as to produce small ice crystals during each freezing stage treatment which do not tend to occlude the solids of the juice or agglomerate together to form large particles which may mechanically retain portions of the juice.

Collecting of the ice crystals after each stage is effected by either removing the ice by centrifuging or by removal of the juice by decanting, or both. Preferably the juice after being subjected to the freezing treatment is transferred to a centrifuge and the juice separated from the ice crystals.

The ice as removed may then be employed for further refrigeration purposes as for cooling the incoming juice being delivered to the first freezing tanks of the series.

After removing substantially all of the water, the juice concentrate is recovered without loss of the delicate esters and aromatics which give the juice the odor and flavor of the original juice. The process thus takes nothing out of the juice except water. The constituents including the terpenes, sesquiterpenes and other biochemical substances which as aforementioned function as antibacterial agents remain in the juice undisturbed both in quality and in their original state. No heat or vacuum having been applied to the juice, there is thus no loss of the delicate volatile constituents of the juice.

There is also no increase in bacterial or enzymatic content or the introduction of foreign matter in the juice inasmuch as this is carefully guarded against.

In order to further enhance and increase the resistance of the juice through bacterial or enzymatic action, there is added thereto a further amount of the juice from the albedo layer. This albedo juice or water may be mechanically recovered from the albedo layer as by pressing the albedo pulpy layer further after removal of the juice to recover additional albedo juice for adding to the juice concentrate produced after freezing. Thus the albedo water content is increased so as to contain from 1 to 5% of the final concentrate. This concentrate after the addition of the albedo water comprises between about 40–66° Brix. Thereafter the juice is immediately canned and is ready for storage or shipment to the consumer. This increase of albedo juice as an addition agent together with the increase sugar content as a result of the removal of water by step-freezing and by the prevention of the formation of bacteria or enzymes during the process functions to produce juice concentrate which can be canned directly and maintained at ordinary room temperature without spoilage. Thus, the necessity of storing the juice concentrate continuously at low temperatures is eliminated.

By this process I avoid the necessity for utilizing heat and vacuum to remove undesired constituents from the juice and thus retain all the antibacterial and enzymatic constituents which together with the increased sugar content provide a juice which does not require refrigeration during storage.

In accordance with the process, by freezing out only the water in the form of fine substantially pure ice crystals, and without occluding juice or solids of the juice, and by fortifying the juice with albedo water from the layer surrounding the fruit juice and at the same time retaining all of the antibacterial and enzymatic constituents, I thereby increase the potency of these preserving constituents and thus produce a juice concentrate which can be stored after canning at ordinary temperatures and, therefore, eliminating the necessity of maintaining the juice continuously under refrigeration as is required of juices made commercially.

Thus, while I have not disturbed the balance of the orange juice in its chemical components, I have increased the ratio of such components to the bacteria or enzymes or other contaminating factors that would cause spoilage by the increase in concentration, the increase in sugar ratio and provide a juice that can be readily preserved upon canning without the use of refrigeration.

It will be understood that I have stated to the best of my ability the theories involved. It is well known that the complete composition of citrus juices is still unknown as of the date of filing this application, but the foregoing statements are based upon experimental work, reduction to practice and extensive tests based upon the acknowledged state of the art, and the technical reactions as reported by the literature. It will be understood I desire to comprehend within my hereinafter appended claims such variations and changes as might be necessary to adapt this invention to a variety of conditions.

It will also be understood that I do not desire to be bound by my statements of theory or speculation, but I have so stated them in order to make the most helpful disclosure for the guidance of the public upon the publication of this patent.

What is claimed is:

1. A citrus juice concentrate from which the water has been removed by freeze dehydration in a series of successive freezing stages and without heat or vacuum treatment, said citrus juice concentrate being characterized by the fact that the ratio of water to the other constituents of the fruit juice has been changed with the increase in ratio of solids to approximately 40° to 66° Brix and which juice has incorporated therewith 1 to 5% by weight of juice mechanically expressed from the albedo layer without introducing constituents from the flavedo layer to enhance its preserving qualities.

2. A citrus juice concentrate which is self-preserving at room temperature (70° F.) without refrigeration, said juice concentrate consisting of the natural citrus juice admixed with juice contained in the albedo layer only and which contains all of the chemical components present in the original juices except water, said juice concentrate having a Brix of between 40° and 66° and containing all of the anti-bacterial and anti-enzymatic constituents present in the original juice and without contamination by foreign matter, said juice having added thereto from 1 to 5% by weight of juice from the albedo layer without introducing constituents from the flavedo layer, whereby the same is preserved against spoilage and the original flavor, taste and aroma of the fresh citrus fruit juice is retained.

References Cited in the file of this patent

UNITED STATES PATENTS

| | | |
|---|---|---|
| 2,187,572 | Meinzer | Jan. 16, 1940 |
| 2,614,048 | Wenzelberger | Oct. 14, 1952 |
| 2,657,555 | Wenzelberger | Nov. 3, 1953 |
| 2,696,440 | Ball | Dec. 7, 1954 |